Patented July 13, 1948

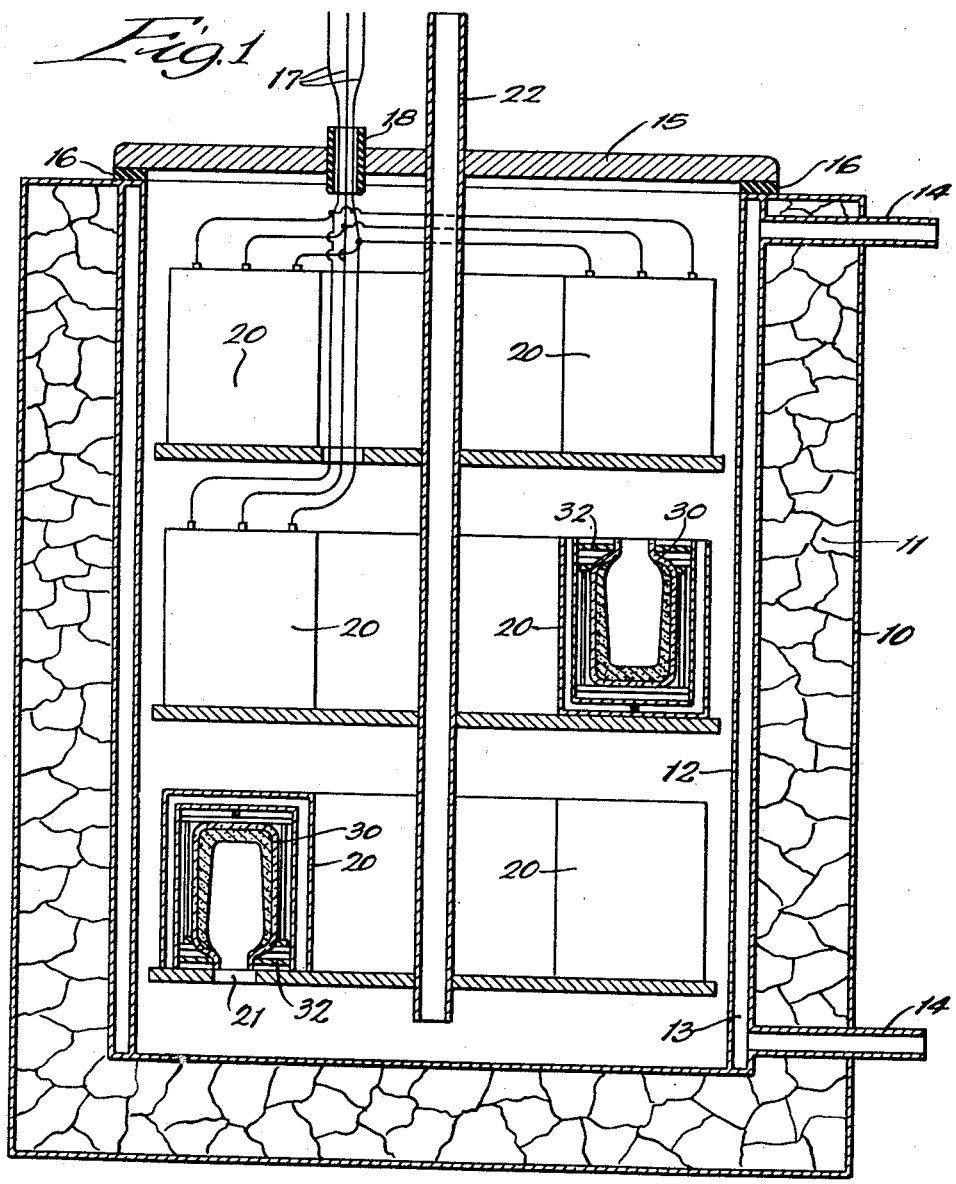

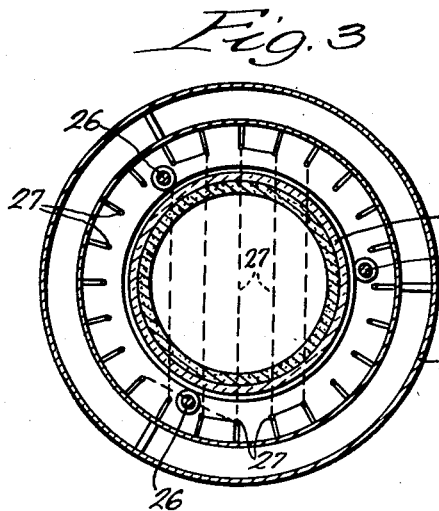
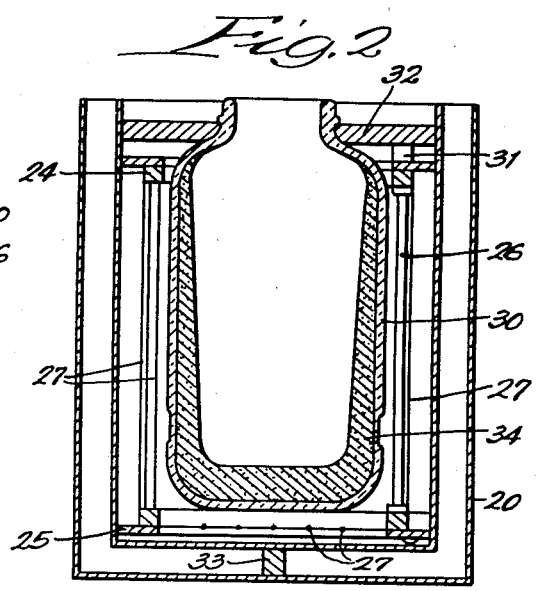
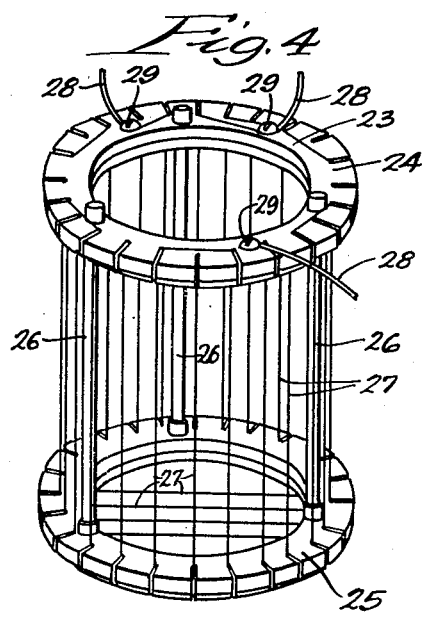
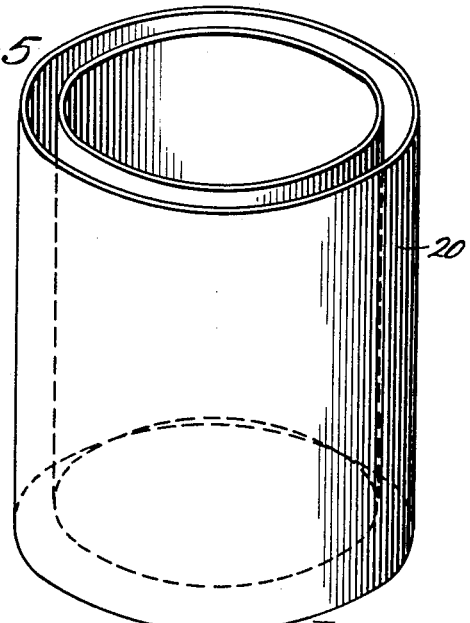

2,445,120

UNITED STATES PATENT OFFICE 2,445,120

DRYING OF FROZEN MATERIALS BY HEAT RADIATION

Sidney O. Levinson and Franz Oppenheimer, Chicago, Ill., assignors to Michael Reese Research Foundation, Chicago, Ill., a corporation of Illinois Application September 8, 1947, Serial No. 772,727

5 Claims. (Cl. 34—4)

This invention relates to the drying of materials. More particularly, the invention relates to a method and apparatus for the drying within a partial vacuum of plasma, fruit and vegetable juices, coffee extracts, and other liquids containing delicate organic substances.

In efforts to dry juices of fruits, vegetables, plasma, and like materials containing large amounts of moisture so as to produce a product which, upon reconstitution by the addition of water, is very similar to the original product, such liquids have been subjected to vacuum for long periods. The time required for any substantial evaporation is so great as to make the process impracticable. Other processes have applied radiations from low temperature hot bodies, such as hot water, heated platens, to the juices, etc. while they are maintained in a frozen state under vacuum, but these processes are similarly ineffective because of the extremely low heat input. The radiations from such bodies are of long wavelength and, while they penetrate the frozen material readily, are not substantially absorbed. Furthermore, the intensity of energy output is so low as to make the process impracticable.

In another process, radiations from high temperature incandescent bodies have been used, which consist mainly of short wavelength radiations, and such waves, while readily absorbed by the frozen material, do not penetrate it, and the result is surface drying without drying the interior of the mass. The heat input has to be kept low because of the lack of penetration and, further, the surface area is subject to overheating and scorching.

None of the processes heretofore suggested have provided a method for the drying of a frozen mass in depth while imparting to the mass a large amount of heat which brings about a quick drying of the mass, while at the same time providing conditions which prevent the temperature of the mass from rising and the material from melting at any point. A certain amount of surface drying can be tolerated if at the same time there is substantial drying in depth because the drying in depth provides a cooling or control of the drying at the surface through the escape of the cold sublimating vapors and prevents overheating or scorching the exterior surface.

In such prior processes, the radiation has been applied to the surface of the material exposed to the vacuum. This results in overheating and scorching the surface because the exposed surface is here subject to the combined effects of vacuum and radiation. The surface which is exposed most to the effects of vacuum and radiation dries rapidly while the interior is little affected. Since the surface exposed to the vacuum will dry first, this surface will become overheated under direct radiation. None of the processes suggest the unique approach in which such radiation is directed through the radiation-pervious support for the material to be dried so that the radiation is first impinged upon the supported surface of the material; i. e., the surface which is not exposed directly to vacuum. There follows the unexpected result that while the exposed surface farthest from the source of radiation dries first; this surface is kept from rising in temperature by the cold vapors liberated in the interior of the frozen mass and which pass through said exposed surface toward the vacuum. Thus the entire mass will stay cold until all the frozen moisture has sublimated.

In methods heretofore employed for the drying of plasma, the container of the frozen material is placed within a chamber maintained under vacuum, and after prolonged periods, the water vapor leaves the frozen product and a resultant dry material is obtained.

The process is unsatisfactory because of the long drying period required and because the capacity or yield of the apparatus is very limited. Even if heat is applied to the container in an effort to speed up the drying, the heat input must be so small and gradual in order to prevent melting of the product, that the drying period remains a prolonged period.

In order to produce a satisfactory product, it is necessary that the frozen material not be melted and that the moisture pass directly from the frozen state to a vaporous condition.

An object of the present invention is to provide a method and means whereby quick and complete drying of the plasma or other material can be effected without denaturation to the product. A further object is to provide means and method steps whereby the yields vastly in excess of those heretofore obtained within a given time can be realized. Other objects and advantages will appear as the specification proceeds.

The invention is illustrated, in a preferred embodiment, by the accompanying drawings, in which—

Figure 1 is a vertical sectional view of apparatus embodying our invention and illustrating the method thereof; Fig. 2, an enlarged sectional view of one of the heating cabinets illustrated in Fig. 1; Fig. 3, a horizontal sectional view of the structure shown in Fig. 2; Fig. 4, a perspective view of the electric heating unit employed; and Fig. 5, a perspective view of the casing for the heating unit.

Any suitable form of apparatus may be employed. In the illustration given in Figs. 1 to 5, inclusive, 10 designates a cabinet having double walls filled with insulation 11 and providing with an integral third wall 12 a refrigerating chamber 13. Pipes 14 provide inlet and outlet means for the refrigerating fluid.

The casing is closed by a closure plate 15 having preferably a resilient sealing gasket 16 to render the interior of the casing airtight. Electric current wires 17 pass through an insulating sealed tube 18 with which the closure plate 15 is provided, as shown in Fig. 1.

Within the chamber provided by the casing member 10 and closure plate 15 are supported three shelves or platforms 19 upon which rest a series of drying cabinets 20. The trays or shelves 19 may be imperforate, permitting the cabinets to rest thereon with the mouth thereof facing upwardly; or, if desired, the cabinets may be inverted and the shelf may be provided with an opening 21 extending therethrough to provide access to the interior of the inverted cabinet, as illustrated in the lower portion of Fig. 1.

Any suitable means for connecting the chamber with vacuum may be employed. In the illustration given, a suction pipe 22 extends through the closure plate 15 in sealing relation therewith and opens in the lower portion of the chamber. It will be understood that the pipe 22 leads to any suitable source of suction (not shown). The trays or shelves 19 may be supported by pipe 22, or by any other suitable means. In the illustration given, the shelves are secured to pipe 22 and are suspended thereon. The pipe 22 is fixedly secured by welding or any other means to the plate 15.

The heating cabinet or container unit 20 may be of any suitable structure. In the illustration given, it comprises a double-walled structure, the inner wall of which is provided with a reflecting surface. A coating of gold, silver, or any other suitable reflecting coating may be placed upon the inner wall of the container 20.

The heating unit 23 may be of any suitable construction. In the illustration given, an upper plate 24 of insulating material is spaced from a similar lower plate 25 by supporting posts 26. Electric resistance wires of Nichrome metal, or any other suitable material, extend through slots in the plates 24 and 25, as illustrated more clearly in Fig. 4. They provide thus vertical wires and bottom horizontal wires adapted to encircle the space between the plates. Electrical connections therewith are made through lines 28 engaging contact screws 29. The plates 24 and 25 are provided with large central openings through which may be extended a glass bottle or container 30.

Secured to the plate 24 and extending outwardly therefrom is a post 31 carrying a hinged clamping ring 32 which, after being opened to receive the container, is adapted to be brought around the neck thereof, as illustrated in Fig. 2, to secure the container to the heater unit. As shown more clearly in Fig. 2, a spacer member 33 extending across the bottom of the unit 20 and between the walls thereof, serves to maintain the walls in spaced and fixed position with respect to each other.

The use of the outer refrigerating unit 13 is optional. The invention herein may be practiced without the refrigerating structure or with it.

Instead of using a refrigerating means, a water-absorbing material, such as phosphorus pentoxide, silica gel, calcium chloride, etc., may be employed for absorbing the moisture. It will be understood that a variety of devices may be employed to condense or absorb the moisture.

While in the illustration given, we have set forth a specific form of container 30, it will be understood that the form of the container may be widely varied. In the illustration given, the frozen material 34 inside of the container 30 is shown in a shape following the contour of the walls and bottom of the container. In the usual shell-freezing operation, a rotation of the container causes the frozen product to assume the shape illustrated, wherein the material follows somewhat the contour of the container walls. While this shape may be advantageously treated under the principles of this invention, it will be understood that the invention may be applied to a frozen material in a different relative position and shape.

In the practice of our invention, we produce infra-red rays of such a type as will penetrate the glass walls of the container 30 without substantial absorption thereby, while at the same time they are absorbed by the frozen material within the container. By this procedure, no heat is applied to the container, and, instead, the heat is absorbed within the frozen material. The heat also penetrates the frozen material so that it acts on all the ice mass at once. It is not completely absorbed by the first layer of ice adjacent to the glass as with contact heat. For this reason of penetration, massive quantities of heat can be imparted to the ice mass without melting, the vacuum being maintained low enough to keep the material below its melting point. The vacuum is maintained at such degree, that the sublimation is brought about at a temperature which is well below the melting point—preferably below 3 mm. of mercury. With this mode of operation, it is found that a very substantial heat input within the frozen material can be accomplished while, by the careful control of the degree of vacuum, a rapid evolving of vapors is produced without any melting of the product. A black body glowing between 250° C. (5.5µ maximum intensity) to 1000° C. (2.3µ maximum intensity) is found to produce satisfactory infrared rays which pass through the glass containers without producing appreciable heat therein, while at the same time being absorbed within the frozen material for the generation of heat therein. A hot body at a temperature between 250° to 1,000° C. emits at least 60% of its total radiation in the spectral range of from 1 to 10µ. This radiation has sufficient penetration and absorption to heat the product substantially uniformly in depth, so that energy is absorbed throughout the material being dried. Such radiation makes it possible to supply, during the principal desiccation period, the heat of sublimation at a rate in excess of one-tenth of a watt per square centimeter.

If conduction heat were employed as in prior practice, only about 1% of this amount of heat could be supplied without causing melting of the layer adjacent the container.

If desired, the temperature of the hot body may be raised to 1,500° C., with the result that 40% of the total radiation is in the spectral range of 1 to 10µ. At the temperatures of from 250° to 1,500° C., the maximum intensity varies from 1.6μ to 5.5μ, while, as indicated, at least 40% of the total radiation is in the range of 1 to 10μ.

In the carrying out of the process, it will be noted that the degree of vacuum is of the utmost importance. The temperature of the frozen material, which is preferably at about −20° C., may be maintained at about this point through the use of a high vacuum. Very satisfactory results have been obtained at a vacuum at 0.5 mm. of mercury. Any suitable range of temperatures producing satisfactory results may be employed, the control of the vacuum in conjunction with the heating means being such as to prevent melting and to cause the moisture to pass directly from the frozen state to a vaporous condition.

In the operation, the container 30 may be supported in upright position, as illustrated, on the intermediate and upper tray, or in inverted position, as illustrated, on the lower tray (see Fig. 1). In the inverted position, very efficient operation is found because the water vapor, which is heavy within a vacuum, tends to flow readily downward and out of the bottle neck.

The cold inner walls 12 of the cabinet 10 tend to condense readily moisture leaving the containers, whether in upright or inverted position, and thus free the interior of the container from the water vapor.

Instead of using containers 30, as illustrated, it will be understood that the invention may be practiced in conjunction with open trays containing frozen orange juice and other fruit juices, as well as blood fractions and other frozen materials.

The suction pipe 22, after being released from a flexible conduit or other means connecting the same with a source of suction, may be lifted to withdraw the closure plate 15 and the three trays, as illustrated, from the cabinet 10 for removal of the containers or for the insertion therein of new containers.

If the trays and cabinets are used in conjunction with a non-refrigerating chamber, the evolved water vapors will be drawn off through pipe 22 and condensed at any desired point outside of the chamber. By employing the structure with a refrigerating cabinet, as shown, the pipe 22 can be used entirely for creating the desired vacuum without having to serve as a conveyor of water vapors, the water vapors being condensed along the inner walls 12 of the refrigerating structure.

The apparatus is extremely compact and capable of high yields. High input of heat can be accomplished without melting or denaturing the frozen plasma or other material.

In the operation described, it will be noted that the heat input extends from the very beginning of the operation and it may be carried through the entire operation. If desired, the current may be turned off toward the end of the drying period. While any shape of container may be employed, it will be noted that the size of the container opening is a contributing factor in the operation since it exercises a control over the withdrawal of vapors. As suggested, instead of a glass jar, a pan or other suitable container may be used.

Any suitable source of radiant energy may be used to impart heat to the frozen material in the drying operation. As illustrated in Figs. 1 to 4, an electric-resistance wire may be used to create the infra-red rays. This wire may be in the form of a coil or band or otherwise arranged. Suitable reflectors may be used to concentrate the rays and to direct them upon the material.

When the frozen orange juice has been subjected to the drying operation, substantially all of the moisture is removed therefrom without affecting the other materials in the orange juice and without in any way affecting the characteristics of the other constituents of the orange juice. The product which is obtained is a crystalline powder containing small fibers. The product should be preserved by maintaining the same in the absence of moisture and in the absence of oxygen. Under these conditions, it may be stored for an indefinite length of time.

In the operation of the invention, the material, which is to be dried, is simultaneously subjected to radiant energy and maintained under a high vacuum to keep the material in the solid or frozen state while the moisture therein is converted to vapor and removed from the material. Various types of apparatus, as illustrated, many be used in carrying out the invention.

The present application constitutes a continuation, in part, of our co-pending application, Serial No. 437,286, for the drying of frozen materials filed April 2, 1942 and now abandoned.

By supplying the heat of sublimation through the radiation of hot bodies emitting from 40 to 60% of their radiation in the spectral range of 1 to 10μ, we find that the material is heated substantially uniformly in depth, and a drying of the mass throughout results. Thus, there is no scorching or scaling of the outside layer of the material because the mass is heated uniformly in depth, the absorption of the infra-red rays in the spectral range of from 1 to 10μ being substantial. The rays readily penetrate the mass and are equally well absorbed by the mass, with the result that they supply the heat of sublimation throughout the mass in the principal desiccation period. When the hot body is at a temperature of from 250 to 1,000° C., substantially 60% of the total radiation is in the spectral range of 1 to 10μ. If desired, the temperature of the hot body may be raised to 1,500° C., and here at least 40% of the total radiation will be in the spectral range of 1 to 10μ. The surface of the juice or other material exposed to the vacuum will be kept cool by the passage of cold vapors from the interior of the frozen mass which is nearer the source of radiation.

While we prefer to direct the radiation from the hot body through a radiation-permeable support carrying the frozen material for the reasons already set out herein, it will be understood that such radiation may be applied directly upon the vacuum-exposed surface of the frozen material and effective drying of the material in depth brought about through the control of the spectral range of such radiation (1 to 10μ). Thus effective penetration of the frozen mass by the radiation is brought about without excessive heating of such surface exposed directly to vacuum, the cold vapors leaving the interior of the frozen mass serving to cool said exposed surface against which such radiation is directed and without such radiation passing through a radiation-permeable member.

While in the foregoing description, we have set forth details and specific steps, it will be understood that these are used for the purpose of illustrating one mode of use of the invention and that those skilled in the art may omit such details or make substitutions therefor without departing from the spirit of our invention.

We claim:

1. In a process for the drying of a liquid containing solids, the steps of maintaining such material in a frozen state by exhausting the atmosphere in a closed system to reduce the temperature below the freezing point of the liquid, supplying the heat of sublimation thereto by the radiation of a hot body emitting at least 60% of its radiation in the spectral range of $1\mu$ to $10\mu$ and having a maximum intensity of radiation within the range of from $1.6\mu$ to $5.5\mu$, and removing vapors liberated by such sublimation, said radiation from said hot body being continuously applied during the drying operation.

2. In a process for the drying of a liquid containing solids, the steps of exhausting the atmosphere about such material in a closed zone to maintain the pressure below 3 mm. of mercury, supplying the heat of evaporation to such material by the radiation of a hot body spaced therefrom and emitting at least 60% of its radiation in the spectral range of 1 to $10\mu$ and having a maximum intensity of radiation within the range of from 2.3 to $5.5\mu$, and removing vapors liberated by such evaporation, said radiation from said hot body being continuously applied during the drying operation.

3. The process of drying liquids containing delicate organic substances which consists in supporting a frozen body of the liquid on a member which permits the passing therethrough of infrared rays, exhausting the atmosphere about the surface of said body that is remote from the supporting member to maintain the temperature below the freezing point of the liquid, passing through said supporting member the radiation of a hot body emitting at least 60% of its radiation in the spectral range of 1 to $10\mu$ and having a maximum intensity of radiation within the range of from 1.6 to $5.5\mu$, and removing vapors liberated by evaporation, said radiation from said hot body being continuously applied during the drying operation.

4. The process of drying liquids containing solids which consists in supporting a frozen body of the liquid upon a cold member permeable to infra-red rays, exhausting the atmosphere about said body in a closed zone to reduce the pressure therein below 3 mm. of mercury, passing through said supporting member the radiation of a hot body separated by an open space from said supporting member and emitting at least 60% of its radiation in the spectral range of 1 to $10\mu$ and having a maximum intensity of radiation within the range of from 1.6 to $5.5\mu$ whereby cold vapors developed within said body move toward and cool the surface of the body remote from the supporting member, and removing said liberated vapors, said radiation from said hot body being continuously applied during the drying operation.

5. The process of drying liquids containing delicate organic substances, which comprises supporting a frozen body of the liquid upon a cold radiation-permeable support and within a closed zone, exhausting the atmosphere about said body in said zone to reduce the pressure below 3 mm. of mercury to maintain said body at a temperature below the freezing point of the liquid, directing the radiation of a hot body emitting at least 60% of its radiation in the spectral range of 1 to $10\mu$ and having a maximum intensity of from 1.6 to $5.5\mu$ through said radiation-permeable support and at a rate in excess of .1 watt per square centimeter of said frozen body whereby cold vapors developed within said body and moving toward the surface remote from said support cools said surface until substantially all of the moisture has been evaporated, said radiation from said hot body being continuously applied during the drying operation.

SIDNEY O. LEVINSON.
FRANZ OPPENHEIMER.

REFERENCES CITED

The following references are of record in the file of this patent:

UNITED STATES PATENTS

| Number | Name | Date |
|---|---|---|
| 1,970,956 | Elser | Aug. 21, 1934 |
| 2,156,845 | Gentele | May 2, 1939 |
| 2,302,253 | Reichel et al. | Nov. 17, 1942 |
| 2,388,917 | Hormel | Nov. 13, 1945 |
| 2,396,561 | Flosdorf | Mar. 12, 1946 |
| 2,414,940 | Flosdorf | Jan. 28, 1947 |

OTHER REFERENCES

"Infra-Red Radiation," pp. 229 and 230 of the magazine "The Chemical Age," Mar. 4, 1944, vol. L, No. 1288.

"The Preparation and Preservation of Human Plasma," by Strumia et al., 480–496 of American Journal of Clinical Pathology, vol. 11, June 1941.

"High Vacuum Condensation Drying of Proteins from the Frozen State," by Greaves et al., pp. 413–445 of Journal of Hygiene, vol. 39, No. 4, July 1939.

"Radiant Heat and Its Application," by James D. Hall, pp. 213–217 of Technical Association Papers, 25th Series, 1942.

"Infra-Red Does the Trick," by A. P. Peck, pp. 124–127, Scientific American, Sept. 1941.